United States Patent
Beumer

(10) Patent No.: US 7,624,353 B2
(45) Date of Patent: Nov. 24, 2009

(54) COMPUTER-IMPLEMENTED CLIPBOARD

(75) Inventor: Bradley R. Beumer, Chicago, IL (US)

(73) Assignee: Accenture Global Services GmbH

( * ) Notice: Subject to any disclaimer, the term of this patent is extended or adjusted under 35 U.S.C. 154(b) by 350 days.

(21) Appl. No.: 11/537,581

(22) Filed: Sep. 29, 2006

(65) Prior Publication Data

US 2008/0082932 A1    Apr. 3, 2008

(51) Int. Cl.
G06F 3/048 (2006.01)
(52) U.S. Cl. .................. 715/764; 715/769; 715/770; 707/100
(58) Field of Classification Search .......... 715/764, 715/770, 769
See application file for complete search history.

(56) References Cited

U.S. PATENT DOCUMENTS

| | | | | |
|---|---|---|---|---|
| 5,765,156 | A * | 6/1998 | Guzak et al. | 707/100 |
| 5,924,099 | A * | 7/1999 | Guzak et al. | 707/100 |
| 6,098,042 | A * | 8/2000 | Huynh | 704/260 |
| 6,309,305 | B1 * | 10/2001 | Kraft | 455/566 |
| 6,944,821 | B1 * | 9/2005 | Bates et al. | 715/209 |
| 7,373,603 | B1 * | 5/2008 | Yalovsky et al. | 715/255 |
| 7,475,390 | B2 * | 1/2009 | Berstis et al. | 717/136 |
| 7,478,336 | B2 * | 1/2009 | Chen et al. | 715/770 |
| 7,496,230 | B2 * | 2/2009 | Chen et al. | 382/182 |
| 2004/0210846 | A1 * | 10/2004 | Olsen | 715/761 |
| 2005/0004986 | A1 * | 1/2005 | Aoki et al. | 709/206 |
| 2005/0091603 | A1 * | 4/2005 | Chen et al. | 715/769 |
| 2005/0102629 | A1 | 5/2005 | Chen | |
| 2005/0154993 | A1 * | 7/2005 | Chen et al. | 715/770 |
| 2005/0154994 | A1 * | 7/2005 | Chen et al. | 715/769 |
| 2005/0203935 | A1 | 9/2005 | McArdle | |
| 2006/0036958 | A1 * | 2/2006 | Dreher | 715/764 |
| 2006/0090210 | A1 * | 4/2006 | Bauchot et al. | 726/26 |
| 2006/0112015 | A1 * | 5/2006 | Chancellor et al. | 705/51 |

(Continued)

FOREIGN PATENT DOCUMENTS

EP    0 785 507    7/1997

(Continued)

OTHER PUBLICATIONS

D. Stone, "The Office Clipboard" PC Magazine, Dec. 2001, pp. 1-2.

(Continued)

Primary Examiner—Kieu Vu
Assistant Examiner—Patrick F Riegler
(74) Attorney, Agent, or Firm—Fish & Richardson P.C.

(57) ABSTRACT

A note can be generated in a clipboard by detecting an information capture operation performed in an application, creating a clipboard item comprising information collected by the information capture operation, wherein the clipboard item is associated with a clipboard, receiving input from a user defining a note, wherein the note includes at least a portion of the clipboard item, and presenting the note in an output text box of the clipboard. Further, a filter can be applied to the information collected by the information capture operation. The filter also can detect an item of meaningful data in the information collected by the information capture operation and execute one or more instructions that correspond to the filter. Additionally, executing the instructions that correspond to the filter can retrieve supporting information from a second application.

27 Claims, 5 Drawing Sheets

U.S. PATENT DOCUMENTS

2006/0218492 A1* 9/2006 Andrade .................... 715/523
2006/0277482 A1* 12/2006 Hoffman et al. ............ 715/764
2007/0130145 A1* 6/2007 Pedersen et al. ............... 707/9

FOREIGN PATENT DOCUMENTS

EP         0 886 413     12/1998
EP         1 452 966     9/2004

OTHER PUBLICATIONS

"Clipboard Mechanism For Exchanging Attributes" IBM Technical Disclosure Bulletin, IBM Corp., vol. 38, No. 10, Oct. 1, 1995, pp. 21-22.

"Append Feature For Clipboards" IBM Technical Disclosure Bulletin, IBM Corp., vol. 36t, No. 6B, Jun. 1, 1993, pp. 271-272.

Extended European Search Report dated Dec. 27, 2007, EP App. No. 07018635.8.

* cited by examiner

COMPUTER-IMPLEMENTED CLIPBOARD

BACKGROUND

The present disclosure relates to a computer-implemented clipboard for capturing information from one or more separate applications, such as a database application or a word processing application.

A computer system can be configured to execute a number of applications that are available for use by a computer user. In some instances a computer user can desire to share information between two or more such applications. For example, a user may wish to copy text or figures from a word processing application into a spreadsheet application instead of manually reentering the information. Thus, the word processing application and the spreadsheet application can communicate, via a user's executing of "cut", "copy", and "paste" operations, to share the information. If the applications cannot communicate directly, they can be configured to communicate through an additional application, such as an electronic clipboard ("clipboard").

The computer system can implement the clipboard in a manner that allows the clipboard to operate as a common buffer that is accessible to two or more applications. For example, information that has been selected in a first application can be added to the clipboard through a capture operation, such as a cut or copy command. Further, once it is available in the clipboard, the captured information can be transferred to one or more separate applications. The captured information also can be retained in the clipboard for further use. Additionally, a clipboard can be associated with one of the communicating applications hosted on the computer system. Alternatively, the clipboard can comprise a separate application. The clipboard also can be part of a graphical user interface (GUI) environment hosted by the computer system and can be structured as a block of memory that is accessible to the applications operating within the GUI environment.

A basic clipboard can accept simple objects, such as plain text and figures. In some implementations, however, a clipboard can be configured to accept meta-information associated with an object, including font, text size, style, color, and formatting. Further, a clipboard also can be configured to accept data structures used to define various attributes of an object, including formulae and references. An object that includes corresponding meta-information or a data structure is referred to as a complex object.

If supported by the clipboard and the receiving application, meta-information and/or data structures associated with a complex object also can be transferred between applications. For example, a spreadsheet cell can be copied into a clipboard such that an associated formula or reference is preserved and updated when the information is inserted into a different application. Alternatively, if a clipboard cannot support a complex object, the clipboard can be configured to reformat the complex object into a simple object that is supported. For example, the clipboard can convert a complex object, such as a HyperText Markup Language (HTML) object, into a simple object, such as plain text.

An object that is to be added to a clipboard can be selected through a number of operations, including a cut or copy command applied to a selected item of information. For example, a portion of text can be selected and captured from a document and added to a clipboard using the copy command included in an associated word processor application. Further, the copy operation used to select information can be initiated by a user through an input interface, such as a keyboard or a cursor. Alternatively, the information to be captured can be automatically selected from an application and copied to the clipboard in response to an event detected by an associated application.

Once information has been added to the clipboard, it can be inserted at a specific location in a target application, such as an electronic document, a spreadsheet, or a form. For example, a user can initiate a paste command to insert the contents of the clipboard into an electronic document at a selected location. If the paste operation is nondestructive, the object in the clipboard is retained and can be successively reapplied.

Further, the amount of storage allocated to a clipboard can be limited. Once the clipboard is full, additional information cannot be added until existing information is deleted. Therefore, the amount of information made accessible through the clipboard can be restricted. In some implementations the clipboard can be limited to a single transaction. Under such a model, each operation that adds an object to the clipboard also functions to overwrite the previous clipboard contents. Therefore, a newly added object is available for use only until the next item of information is captured.

In another implementation, a clipboard manager can enable a clipboard to store multiple objects and to perform multiple transactions. The clipboard can be configured as a first-in first-out (FIFO) stack or a scrap book. In such an implementation, the object most recently added to the clipboard can be inserted at the top of the stack. When an object is subsequently added to the clipboard, the object at the bottom of the stack is deleted. Thus, the clipboard retains the objects that have been most recently captured.

Alternatively, once the clipboard is at capacity, the clipboard manager can permit the user to select one or more objects to remove from the clipboard when a new object is to be added. As such, a frequently used object can be retained in the clipboard regardless of when it was added. Further, the clipboard manager also can be configured to permit a user to select the object that is to be inserted into the target application. Thus, the user can browse all of the objects available in the clipboard and select the desired object.

Clipboards have been used in conjunction with a variety of applications that process or otherwise utilize text-based information, including word processing, spreadsheets, databases, web browsers, and custom applications. A clipboard also can be configured to support graphical objects, including images, and executable objects, including hyperlinks. With respect to both text-based information and graphical objects, clipboards are configured to maintain the integrity of the captured information. Therefore, with the exception of unsupported information, an object that has been captured from one application retains the same appearance and characteristics when it is inserted into a different application. Once inserted, however, the object can be modified by a user.

SUMMARY

The present inventor recognized the need to provide an improved system and method for capturing information in an intelligent clipboard. Further, the need was recognized to apply one or more filters to an item of captured information to determine whether the captured information includes meaningful data and, if so, to execute one or more corresponding instructions. Additionally, the present inventor recognized the need to provide a library of filters that can be applied to captured information through the intelligent clipboard.

The present inventor also recognized the need to capture in the intelligent clipboard information corresponding to one or more applications that are accessible on a computer system.

Further, the present inventor recognized the need to permit a user to utilize one or more items of captured information to generate a note in the intelligent clipboard. The present inventor also recognized the need to permit a user to edit a note in the intelligent clipboard. Additionally, the need was recognized to output a note generated in the intelligent clipboard to an associated application, such as a customer relationship management (CRM) application.

The present inventor also recognized the need perform spelling and grammar checks on a note generated in the intelligent clipboard prior to outputting the note. Further, the need was recognized to localize spelling and grammar checking in accordance with user preference or a particular geographic region. Additionally, the present inventor recognized the need to store all of the information captured during a transaction in a single instance of the intelligent clipboard, such as an individual window. The present inventor also recognized the need to make each item of captured information accessible to a user. Additionally, the need was recognized to delete one or more items of information from the clipboard.

In general, in one aspect, the techniques can be implemented to include detecting an information capture operation performed in an application, creating a clipboard item comprising information collected by the information capture operation, wherein the clipboard item is associated with a clipboard, receiving input from a user defining a note, wherein the note includes at least a portion of the clipboard item, and presenting the note in an output text box of the clipboard.

The techniques also can be implemented such that receiving input from the user further comprises receiving one or more items of text. Further, the techniques can be implemented to include outputting the note to a second application, wherein the second application is associated with the clipboard. Additionally, the techniques can be implemented to include analyzing one or more operating system messages to identify the occurrence of the information capture operation.

The techniques also can be implemented to include applying a filter to the information collected by the information capture operation. The techniques further can be implemented to include detecting an item of meaningful data in the information collected by the information capture operation and executing one or more instructions corresponding to the applied filter. Additionally, the techniques can be implemented to include retrieving supporting information from a second application.

The techniques also can be implemented to include receiving an input selecting the clipboard item and inserting the selected clipboard item into the output text box. Further, the techniques can be implemented to include detecting a second information capture operation and creating a second clipboard item comprising information collected by the second information capture operation, wherein the second clipboard item is separately displayed in the clipboard.

In general, in another aspect, the techniques can be implemented as a computer program product, encoded on a computer-readable medium, operable to cause data processing apparatus to perform operations comprising detecting an information capture operation performed in an application, creating a clipboard item comprising information collected by the information capture operation, wherein the clipboard item is associated with a clipboard, receiving input from a user defining a note, wherein the note includes at least a portion of the clipboard item, and presenting the note in an output text box of the clipboard.

The techniques also can be implemented such that receiving input from the user further comprises receiving one or more items of text. Further, the techniques can be implemented to be further operable to cause data processing apparatus to perform operations comprising outputting the note to a second application, wherein the second application is associated with the clipboard. Additionally, the techniques can be implemented to be further operable to cause data processing apparatus to perform operations comprising analyzing one or more operating system messages to identify the occurrence of the information capture operation.

The techniques also can be implemented to be further operable to cause data processing apparatus to perform operations comprising applying a filter to the information collected by the information capture operation. Moreover, the techniques can be implemented to be further operable to cause data processing apparatus to perform operations comprising detecting an item of meaningful data in the information collected by the information capture operation and executing one or more instructions corresponding to the applied filter. Additionally, the techniques can be implemented to be further operable to cause data processing apparatus to perform operations comprising retrieving supporting information from a second application.

The techniques also can be implemented to be further operable to cause data processing apparatus to perform operations comprising receiving an input selecting the clipboard item and inserting the selected clipboard item into the output text box. Additionally, the techniques can be implemented to be further operable to cause data processing apparatus to perform operations comprising detecting a second information capture operation and creating a second clipboard item comprising information collected by the second information capture operation, wherein the second clipboard item is separately displayed in the clipboard.

In general, in another aspect, the techniques can be implemented as a system comprising a user interface for presenting a clipboard to a user and for receiving one or more inputs from the user; and processor electronics configured to perform operations comprising detecting an information capture operation performed in an application, creating a clipboard item comprising information collected by the information capture operation, wherein the clipboard item is associated with the clipboard, generating a note based on input received from the user, wherein the note includes at least a portion of the clipboard item, and presenting the note in an output text box of the clipboard.

The techniques also can be implemented to include processor electronics configured to perform operations comprising outputting the note to a second application, wherein the second application is associated with the clipboard. Further, the techniques can be implemented to include processor electronics configured to perform operations comprising applying a filter to the information collected by the information capture operation. Additionally, the techniques can be implemented to include processor electronics configured to perform operations comprising detecting an item of meaningful data in the information collected by the information capture operation and executing one or more instructions corresponding to the applied filter. The techniques further can be implemented to include processor electronics configured to perform operations comprising retrieving supporting information from a second application.

The techniques also can be implemented to include processor electronics configured to perform operations comprising receiving an input selecting the clipboard item and inserting the selected clipboard item into the output text box. Additionally, the techniques can be implemented to include processor electronics configured to perform operations comprising detecting a second information capture operation and creating a second clipboard item comprising information collected by the second information capture operation, wherein the second clipboard item is separately displayed in the clipboard.

The techniques described in this document can be implemented to realize one or more of the following advantages. For example, the techniques can be implemented to permit a user to capture information from multiple applications and to store the captured information in a single instance of an intelligent clipboard. The techniques also can be implemented to reduce the time required to generate a note by making one or more items of information captured from a separate application accessible to a user. Additionally, the techniques can be implemented to reduce the time required for a user to complete a transaction, such as servicing a customer, by displaying one or more items of relevant information in a single screen.

The techniques also can be implemented to automatically retrieve additional information associated with a captured item of information, such as from a networked data server or an independent application. Additionally, the techniques can be implemented to prompt a user to consider one or more automated indications or suggestions relating to an item of captured information. The techniques further can be implemented such that the intelligent clipboard provides a record of the information gathered during a single transaction, such as a service call with a customer. Moreover, the techniques can be implemented to reduce the number of errors contained in a note by allowing information from other applications to be replicated and by performing spelling and/or grammar checking prior to outputting a note.

These general and specific techniques can be implemented using an apparatus, a method, a computer program product, a system, or any combination of an apparatus, methods, computer program products, and systems. The details of one or more implementations are set forth in the accompanying drawings and the description below. Further features, aspects, and advantages will become apparent from the description, the drawings, and the claims.

BRIEF DESCRIPTION OF THE DRAWINGS

Like reference symbols indicate like elements throughout the specification and drawings.

DETAILED DESCRIPTION

Figure 1:
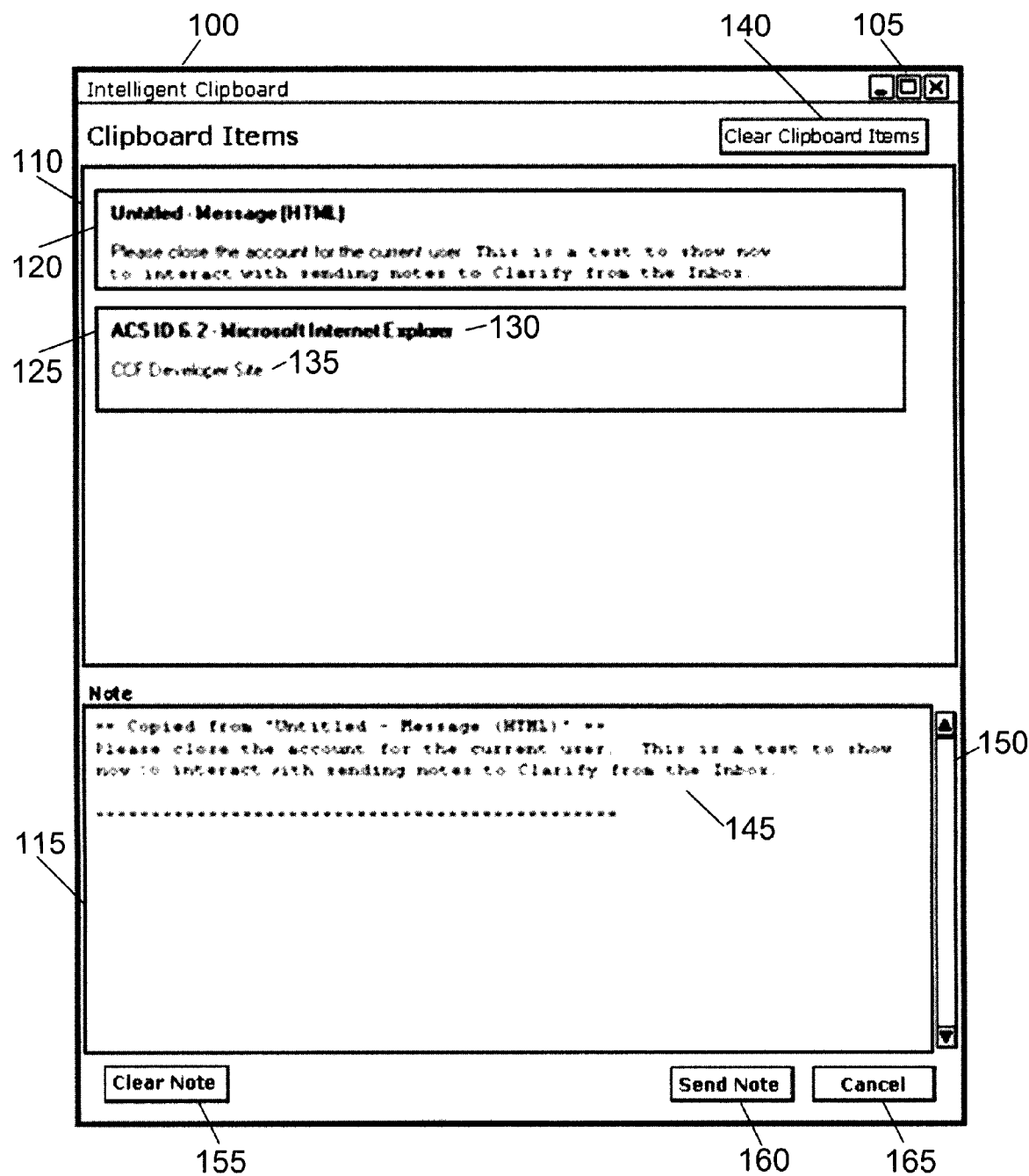
FIG. 1 presents an implementation of an intelligent clipboard.

A system and method for an intelligent clipboard (or "clipboard") that can be configured to capture information, such as text copied from a database application or a word processing application, and to apply one or more text filters to the captured information can be implemented in computer software on a conventional computer. FIG. 1 presents an implementation of an intelligent clipboard 100 that can be displayed as a window in a GUI generated by a conventional computer. The intelligent clipboard 100 can include one or more window controls 105, such as minimize, maximize, and close, that permit a user to manipulate the window. Additionally, the window controls 105 can be adapted to correspond to the operating system (OS) of the computer on which the intelligent clipboard 100 is hosted.

A clipboard panel 110 included in the intelligent clipboard 100 can be configured to store and present a plurality of clipboard panel items (or "clipboard items"). Further, the intelligent clipboard 100 also can include a clipboard listener (not shown) that is registered with the computer system OS. The clipboard listener is operable to detect messages produced by the computer system OS, including messages indicating the occurrence of clipboard events. A clipboard event comprises any operation in which information is captured from an application, such as a cut or copy operation performed on a selected portion of text. For example, the Microsoft® Win32® application programming interface (API) provides messages indicating the occurrence of each information capture operation performed in a registered application.

Upon detection of a clipboard event by the clipboard listener, the intelligent clipboard 100 determines whether the captured information already has been added to the clipboard panel 110. If the captured information is not included in the clipboard panel 110, a new clipboard panel item containing the captured information is generated. In an implementation, each new clipboard panel item is added to the top of the clipboard panel 110. Thus, the first (or earliest) clipboard panel item added to the clipboard panel 110 is displayed as the last clipboard panel item in the group. Further, a scroll bar associated with the clipboard panel 110 can be displayed if the clipboard panel items exceed the available display space.

In the clipboard panel 110, the clipboard panel items, such as the most recent clipboard panel item 120 and the initial clipboard panel item 125, are separately presented. Further, in addition to the captured information, a clipboard panel item can include a designation identifying the specific application or window that was the source of the captured information. For example, the initial clipboard panel item 125 includes both the captured information 135 and a source identifier 130. The source identifier 130 indicates that the information was captured from a Microsoft® Internet Explorer® window. In an implementation, a source identifier can be captured from an application in the same operation as the information. For example, the Microsoft® Win32® API can extract an application title or other such application identifier during an information capture operation.

An output text box 115 also can be included in the intelligent clipboard 100 to provide an area in which a user can enter information. A clipboard panel item, such as the first clipboard panel item 120, can be inserted into the output text box 115 as a text entry 145 by double-clicking any portion of the clipboard panel item displayed in the clipboard panel 110. Further, once the clipboard panel item 120 is displayed in the output text box 115 as a text entry 145, the text can be edited by a user. For example, the user can delete information from the text entry 145, add information to the text entry 145, modify one or more formatting attributes associated with the text entry 145, and combine multiple text entries. Thus, one or more clipboard panel items can be inserted into the output text box 115 as text entries for use in generating a note. In an implementation, a clipboard panel item also can be added to the output text box 115 in various other ways, including by dragging and dropping the clipboard panel item, through a menu option, or through one or more hot keys.

Information also can be manually entered into the output text box 115, such as through typing. Further, the manually entered information can be combined with text from one or more text entries to generate a note. For example, manually entered information can be combined with one or more text entries to generate a record of an event or a transaction summary. Additionally, if the information presented in the output text box 115 exceeds the limits of the display area, a scroll bar 150 can be provided to permit a user to view all of the information.

The intelligent clipboard 100 also can include one or more controls that can be activated by a user, such as through the GUI. For example, the intelligent clipboard 100 can include a clear clipboard items button 140. Selecting the clear clipboard items button 140 causes all of the clipboard panel items displayed in the clipboard panel 110 to be deleted. In an implementation, one or more clipboard panel items also can be selectively deleted from the clipboard panel 110. For example, a user can designate one or more clipboard panel items and enter a delete command to remove only the designated items.

Further, the intelligent clipboard 100 can include a clear note button 155, which is operable to delete all of the information displayed in the output text box 115. A send note button 160 also can be presented in conjunction with the output text box 115. In an implementation, the intelligent clipboard 100 can be associated with one or more other applications. Selecting the send note button 160 causes the information contained in the output text box 115, such as a user note, to be output to a corresponding application. For example, the send note button 160 can be configured to output a call summary to a CRM application that will associate the call summary with a corresponding customer record. If the intelligent clipboard 100 is associated with more than one application, a send note button corresponding to each associated application can be presented. Alternatively, upon selecting the send note button 160, the user can be presented with a menu of associated applications to which the note can be output. Additionally, the intelligent clipboard 100 can include a cancel button 165 to terminate the application and close the intelligent clipboard 100.

Figure 2:
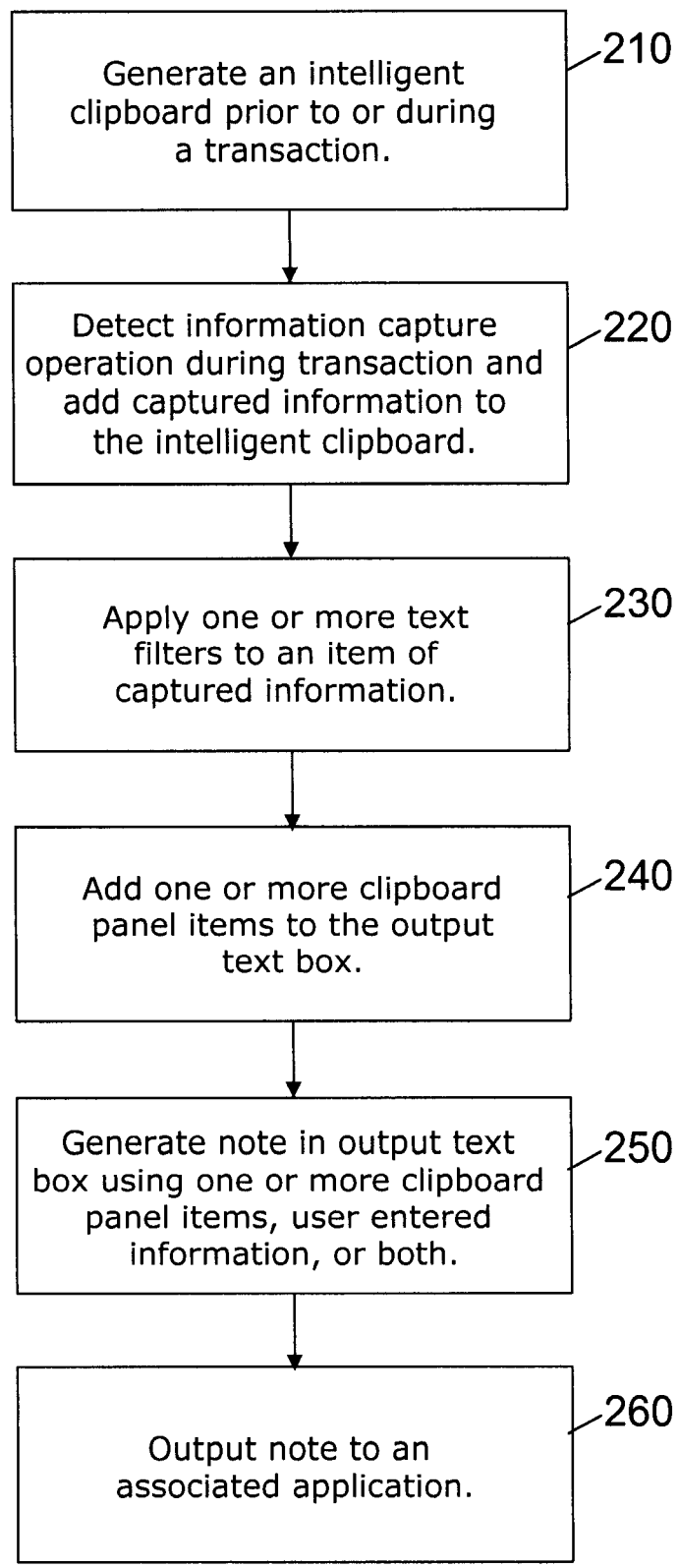
FIG. 2 is a flowchart that describes using an intelligent clipboard to generate a note.

FIG. 2 is a flowchart that describes using an intelligent clipboard to generate a note. An intelligent clipboard can be utilized in conjunction with a wide variety of applications, including applications that call for the sharing of text-based information. An intelligent clipboard implementation is described with respect to a customer care framework, such as a call center application. An instance of an intelligent clipboard can be generated prior to or during a transaction, such as a customer care session (210). The intelligent clipboard can be generated by initializing the intelligent clipboard application. Alternatively, an existing instance of the intelligent clipboard can be cleared of all information associated with a previous transaction, such as by activating the clear clipboard items button and the clear note button.

In an implementation, the intelligent clipboard instance associated with a transaction also can be automatically loaded with one or more clipboard panel items associated with that transaction. For example, an associated computer telephony integration (CTI) application can pass one or more items of information, such as a caller name and a caller telephone number, to the intelligent clipboard for display as clipboard panel items. Thus, the passed information will be available to the intelligent clipboard user early in the transaction.

One or more information capture operations can be detected during the transaction and each item of captured information can be added to the intelligent clipboard as a clipboard panel item (220). A single clipboard panel item comprises all of the information corresponding to a single capture operation. For example, an entire paragraph of text can be captured from a word processing application through a copy operation and added to the intelligent clipboard as an individual clipboard panel item.

As indicated above, a clipboard listener associated with the intelligent clipboard can be configured to detect information capture operations performed in one or more other applications. For example, the clipboard listener can receive captured information through the OS of the host computer, such as Microsoft® Windows®. Additionally, the intelligent clipboard can be configured to format captured information prior to displaying the information as a clipboard panel item. For example, a complex object including meta-information that is not supported by the intelligent clipboard can be translated into a supported format, such as a simple object, by deleting one or more items of meta-information. In an implementation, the intelligent clipboard further can be configured to create a new clipboard panel item from captured information only if the captured information is not already displayed in the clipboard panel.

As discussed above, an identifier that describes the source of the captured information also can be incorporated into a clipboard panel item. The user can thus access the source application corresponding to a specific clipboard panel item if additional information is required. Further, the identifier can be extracted from the source application during the information capture operation. For example, the intelligent clipboard can receive the identifier and the captured information from the Microsoft® Win32® API.

One or more text filters also can be applied to an item of captured information (230). A text filter can be configured to analyze the captured information to determine whether the information contains one or more items of meaningful data. The text filter further can be configured to automatically perform one or more actions based on the items of meaningful data that are detected. For example, a text filter can be configured to determine whether a product number is included in captured information. If a product number is detected, the text filter can then trigger one or more operations to retrieve supporting information, such as accessing a product catalog to obtain a corresponding product description or accessing an inventory management application to determine product availability.

The supporting information retrieved by a text filter also can be added to the intelligent clipboard as a clipboard panel item. Consequently, the supporting information is automatically made available to the user. Further, the supporting information also can be incorporated into the output text box for use in generating a note. Alternatively, the supporting information can be separately displayed to the user, such as in a pop-up window. The supporting information thus can be utilized to prompt the user to perform a task. For example, the user can be prompted to mention service upgrades or new products to customers who have a particular plan or live in a specific region.

One or more clipboard panel items displayed in the clipboard panel can be added to the output text box (240). The process of adding a clipboard panel item to the output text box is nondestructive, so the clipboard panel item also is retained in the clipboard panel. Thus, if a user clears the output text box using the clear note button, all of the clipboard panel items will remain available in the clipboard panel for use in creating a new note. As indicated above, a user can add a clipboard panel item to the output text box by double-clicking the item, dragging the item from the clipboard panel and dropping the item in the output text box, through a menu option, or by actuating one or more hot keys. Additionally, a selected clipboard panel item can be distinguished in the clipboard panel from one or more non-selected clipboard panel items, such as through highlighting or shading, or by changing the color of a border appearing around the clipboard panel item.

A user can generate a note in the output text box using information from one or more clipboard panel items, information entered by the user, or both (250). For example, in the customer care implementation, a user can generate a note describing a service transaction with a customer. The note can include information added to the clipboard panel through one or more capture operations performed in associated applications, such as a customer database or an intranet page. Further, the note can include information that is manually entered by the user, such as details regarding the customer service transaction.

Once it has been generated, the note in the output text box can be output to an associated application (260). Further, the associated application can be configured to receive the note and perform one or more operations. For example, a note generated in response to a customer service transaction can be output to an associated CRM application, which can store the note in a corresponding customer record. Transfer of the note can be initiated by the user, such as by clicking the send note button.

Additionally, the intelligent clipboard can be configured to perform a spelling check and/or a grammar check when the send note button is clicked. The spelling check and the grammar check both can be performed prior to outputting the note to the associated application. Alternatively, user-selectable spelling check and grammar check controls can be provided in the intelligent clipboard interface. In an implementation, spelling and grammar errors recognized by the intelligent clipboard can be automatically corrected and the user can be prompted to clear unrecognized errors. Further, the spelling and grammar checking of the intelligent clipboard can be customized according to user location or preference. In an implementation, the spelling and grammar checking also can be configured to support multiple languages.

Figure 3:
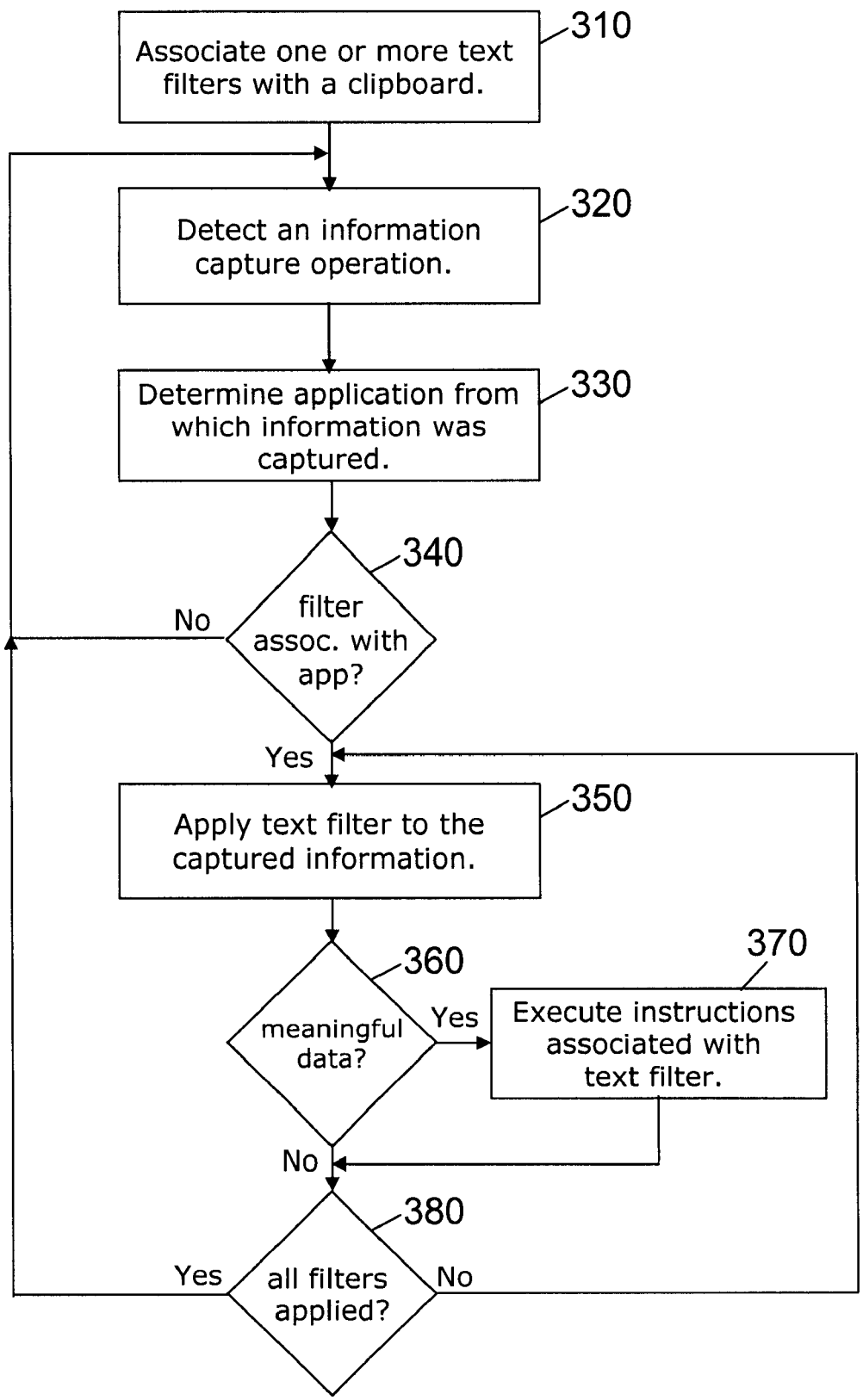
FIG. 3 is a flowchart that describes applying one or more text filters to an item of captured information.

FIG. 3 is a flowchart that describes applying a text filter to an item of captured information. One or more text filters can be associated with an intelligent clipboard at any time during operation of the clipboard (310). For example, one or more text filters can be loaded when the intelligent clipboard is initialized. As described above, an intelligent clipboard can detect an information capture operation (320). In an implementation, the intelligent clipboard detects an information capture operation by monitoring messages generated by the computer system OS. For example, the Win32® API can generate one or more messages indicating the occurrence of an information capture operation, such as a cut or copy. Once detected, the item of captured information can be inserted into the intelligent clipboard as a clipboard panel item.

Further, the intelligent clipboard can be configured to determine the identity of the source application from which the information was captured (330). An application identifier, such as an application name or a window title, can be captured from the application along with the selected information. For example, the Win32® API can extract the application title while performing the information capture operation. Based on the source application identifier, a text filter manager associated with the intelligent clipboard can determine whether the intelligent clipboard has been loaded with one or more text filters that correspond to the source application (340). If the intelligent clipboard has not been loaded with any text filters that correspond to the source application, no text filters are applied. Alternatively, if the text filter manager determines that the intelligent clipboard has been loaded with one or more text filters that correspond to the source application, the corresponding text filters can be applied.

In an implementation, one or more global text filters can be specified that are applied to each item of captured information without regard to the identity of the source application. In another implementation, a user can specify one or more configuration settings in the text filter manager. The user can thereby deactivate one or more text filters associated with the intelligent clipboard, such that the deactivated text filters are not applied to captured information. Alternatively, a text filter can be configured to require user approval before one or more of the associated instructions can be executed.

The one or more corresponding text filters can be applied in any order to analyze the contents of the captured information (350). In performing the analysis, an algorithm associated with the applied text filter is used to parse the captured information to determine whether any meaningful data is present (360). For example, information captured from a product catalog application can be analyzed to determine whether it includes a product identifier, such as a product number.

If meaningful data is detected in the captured information, one or more instructions associated with the text filter are executed (370). For example, if a product number is detected, a query can be submitted to an inventory database to determine how many units of that product are available. Further, the information generated by the executed instructions can be automatically provided to the user. For example, the generated information can be added to the clipboard panel as an additional clipboard panel item, displayed with the clipboard panel item that contained the meaningful data, or separately presented to the user, such as in a pop-up window.

After the instructions associated with a text filter have been executed, or if no meaningful data was detected by the text filter, the intelligent clipboard can determine whether all of the corresponding text filters have been applied (380). If all of the corresponding text filters have been applied, the intelligent clipboard can await the next information capture operation. Otherwise, one of the remaining text filters can be applied to the captured information (350).

Figure 4:
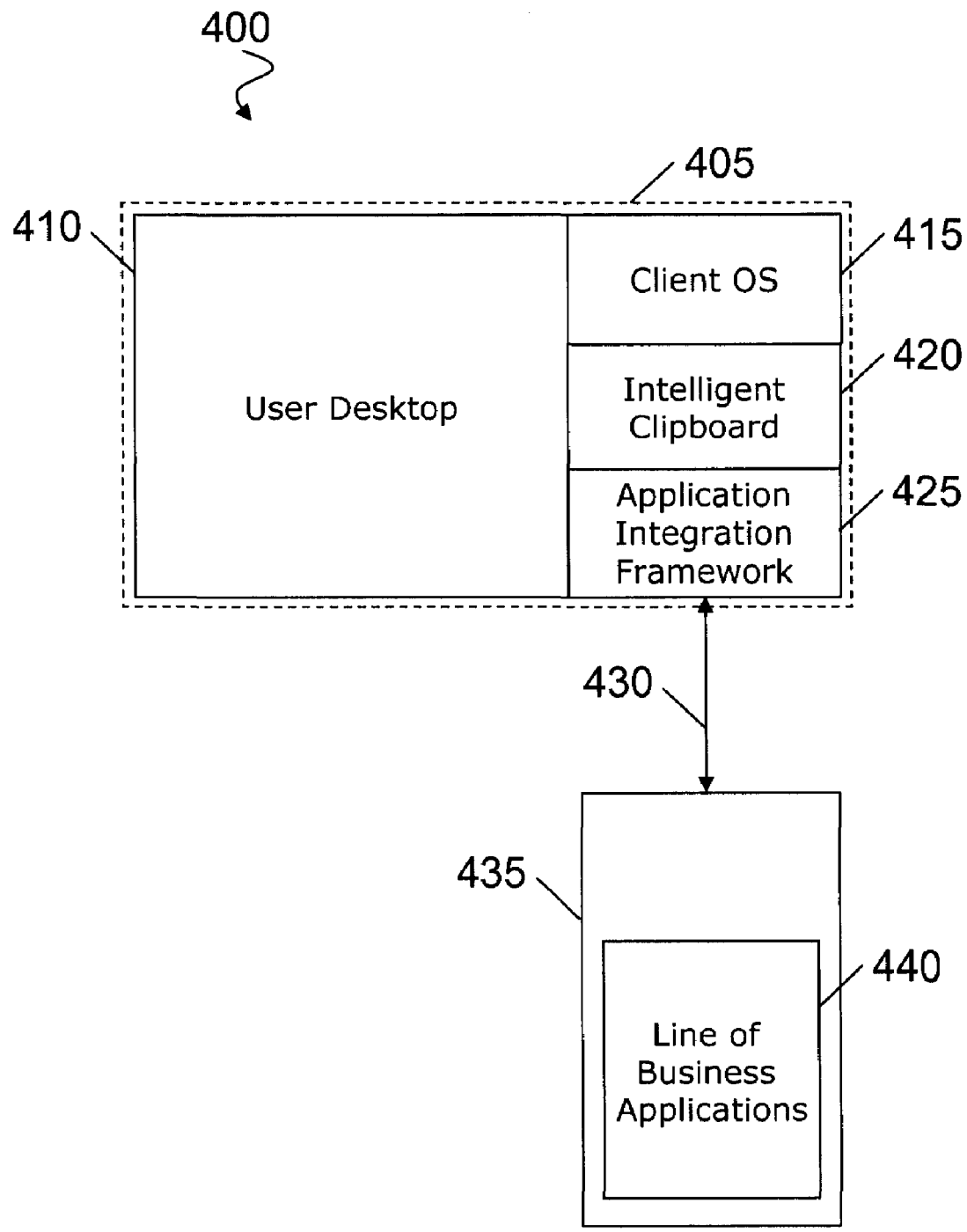
FIG. 4 presents an implementation of a computer system in which an intelligent clipboard can operate.

FIG. 4 presents an implementation of computer system 400 in which an intelligent clipboard 420 can be configured to operate. The computer system 400 includes a client computer 405 that can be accessed by a user, such as a customer service agent. The client computer 405 includes a user desktop 410 that presents an interface to the user, such as a GUI. The user desktop 410 can be configured to display one or more applications that are accessible on the client computer 405, including the intelligent clipboard 420. Further, the client computer 405 can include one or more user inputs, such as a keyboard, a mouse, a touch pad, a touch screen, and a microphone.

A client OS 415 is operable to integrate and manage the one or more applications accessible on the client computer 405. Further, the client OS 415 generates OS messages that indicate the occurrence of operations executed by the one or more applications, such as messages identifying the occurrence of information capture operations. The intelligent clipboard 420 can detect and process the OS messages, including accessing captured information and source application identifiers included in the messages.

Additionally, the client computer 405 can include an application integration framework 425 that provides an interface to one or more line of business applications 440. Thus, the application integration framework 425 can be configured to coordinate the execution of one or more line of the business applications 440 on the client computer 405. The line of business applications 440 can be hosted on one or more servers 435, which can be separated from the client computer 405 by any distance. Additionally, a communication interface 430 can provide bi-directional access between the client computer 405 and the servers 435. The communication interface 430 can be any wired or wireless communication path, including a local area network connection or an Internet connection.

In an implementation, the application integration framework 425 also can be configured to coordinate the capture of information from the one or more line of business applications 440 and to make the captured information accessible to the intelligent clipboard 420. Further, the application integration framework 425 can coordinate the transfer of a note from the output text box of the intelligent clipboard 420 to an associated application, such as one of the line of business applications 440.

For example, the intelligent clipboard 420 can be associated with a CRM application that comprises one of the line of business applications 440. A note output from the intelligent clipboard 420 can be provided as input to the CRM application, which can perform one or more actions based on the received note. In an implementation, the intelligent clipboard 420 can be associated with two or more of the line of business applications 435. The intelligent clipboard 420 therefore can include user controls to selectively direct a note that is being output. For example, the intelligent clipboard 420 can include a send note button that corresponds to each of the associated line of business applications 435. Alternatively, the intelligent clipboard 420 can include a send note menu that can be used to specify which of the associated line of business applications 435 is to receive the note being output.

Figure 5:
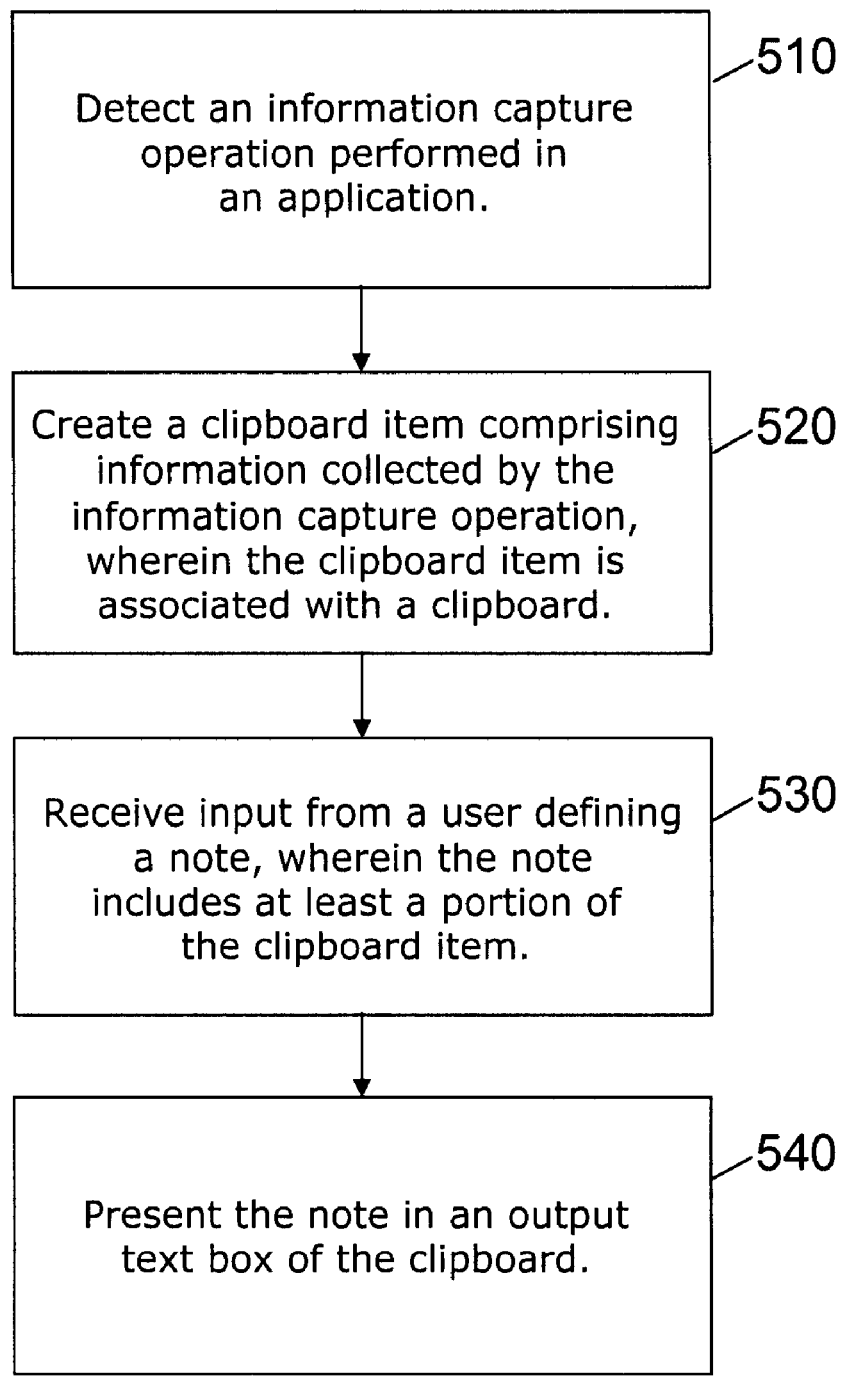
FIG. 5 describes a method of generating a note in an intelligent clipboard.

FIG. 5 describes a method of generating a note in a clipboard, such as an intelligent clipboard. An information capture operation performed in an application can be detected (510). Further, a clipboard item comprising information collected by the information capture operation can be created, wherein the clipboard item is associated with a clipboard (520). Further, input defining a note can be received from a user, wherein the note includes at least a portion of the clipboard item (530). Once input defining the note has been received, the note can be presented in an output text box of the clipboard (540).

The subject matter of this specification has been described in terms of particular implementations, but other implementations also are within the scope of the following claims. For example, the actions recited in the claims can be executed in a different sequence and still achieve desirable results. Further, the processes described with respect to the accompanying figures are not required to be performed in the order shown, or in a sequential order, in order to achieve desirable results. In certain implementations, multitasking and parallel processing can be utilized. Other variations also are within the scope of the following claims.

What is claimed is:

1. A method comprising:
   detecting an information capture operation performed in an application;
   creating a clipboard item comprising information collected by the information capture operation, wherein the clipboard item is associated with a clipboard;
   applying, using at least one processor, a text filter to analyze the information collected by the information capture operation for one or more items of specified textual content;
   based on the analysis applied by the text filter, detecting, using at least one processor, an item of specified textual content in the information collected by the information capture operation;
   in response to detecting the item of specified textual content in the information collected by the information capture operation:
      automatically identifying, using at least one processor, an application that includes supplemental information related to the item of specified textual content, the application being different than a source of the information collected by the information capture operation,
      automatically triggering, using at least one processor, an operation to retrieve, from the identified application, the supplemental information related to the item of specified textual content, and
      automatically supplementing, using at least one processor, the clipboard with the supplemental information retrieved from the identified application;
   receiving input from a user defining a note, wherein the note includes at least a portion of the clipboard item and at least a portion of the supplemental information;
   presenting the note in an output text box of the clipboard;
   receiving a user input command to send the note presented in the output text box of the clipboard;
   in response to receiving the user input command to send the note:
      identifying an application corresponding to the note; and
      outputting the information included in the note to the identified application corresponding to the note,
   wherein outputting the information included in the note to the identified application corresponding to the note comprises outputting a call summary to a customer relationship management application that associates the call summary with a corresponding customer record.

2. The method of claim 1, wherein receiving input from the user further comprises receiving one or more items of text.

3. The method of claim 1, further comprising:
   outputting the note to a second application, wherein the second application is associated with the clipboard.

4. The method of claim 1, wherein detecting an information capture operation further comprises:
   analyzing one or more operating system messages to identify the occurrence of the information capture operation.

5. The method of claim 1, further comprising:
   detecting a second information capture operation; and
   creating a second clipboard item comprising information collected by the second information capture operation, wherein the second clipboard item is separately displayed in the clipboard.

6. A computer program product, encoded on a computer-readable medium, operable to cause data processing apparatus to perform operations comprising:
   detecting an information capture operation performed in an application;
   creating a clipboard item comprising information collected by the information capture operation, wherein the clipboard item is associated with a clipboard;
   applying, using at least one processor, a text filter to analyze the information collected by the information capture operation for one or more items of specified textual content;
   based on the analysis applied by the text filter, detecting, using at least one processor, an item of specified textual content in the information collected by the information capture operation;

in response to detecting the item of specified textual content in the information collected by the information capture operation:
    automatically identifying, using at least one processor, an application that includes supplemental information related to the item of specified textual content, the application being different than a source of the information collected by the information capture operation,
    automatically triggering, using at least one processor, an operation to retrieve, from the identified application, the supplemental information related to the item of specified textual content, and
    automatically supplementing, using at least one processor, the clipboard with the supplemental information retrieved from the identified application;
receiving input from a user defining a note, wherein the note includes at least a portion of the clipboard item and at least a portion of the supplemental information;
presenting the note in an output text box of the clipboard;
receiving a user input command to send the note presented in the output text box of the clipboard;
in response to receiving the user input command to send the note:
    identifying an application corresponding to the note; and
    outputting the information included in the note to the identified application corresponding to the note,
wherein outputting the information included in the note to the identified application corresponding to the note comprises outputting a call summary to a customer relationship management application that associates the call summary with a corresponding customer record.

7. The computer program product of claim 6, wherein receiving input from the user further comprises receiving one or more items of text.

8. The computer program product of claim 6, further operable to cause data processing apparatus to perform operations comprising:
    outputting the note to a second application, wherein the second application is associated with the clipboard.

9. The computer program product of claim 6, further operable to cause data processing apparatus to perform operations comprising:
    analyzing one or more operating system messages to identify the occurrence of the information capture operation.

10. The computer program product of claim 6, further operable to cause data processing apparatus to perform operations comprising:
    detecting a second information capture operation; and
    creating a second clipboard item comprising information collected by the second information capture operation, wherein the second clipboard item is separately displayed in the clipboard.

11. A system comprising:
    a user interface for presenting a clipboard to a user and for receiving one or more inputs from the user; and
    processor electronics configured to perform operations comprising:
        detecting an information capture operation performed in an application;
        creating a clipboard item comprising information collected by the information capture operation, wherein the clipboard item is associated with a clipboard;
        applying a text filter to analyze the information collected by the information capture operation for one or more items of specified textual content;
        based on the analysis applied by the text filter, detecting an item of specified textual content in the information collected by the information capture operation;
        in response to detecting the item of specified textual content in the information collected by the information capture operation:
            automatically identifying an application that includes supplemental information related to the item of specified textual content, the application being different than a source of the information collected by the information capture operation,
            automatically triggering an operation to retrieve, from the identified application, the supplemental information related to the item of specified textual content, and
            automatically supplementing the clipboard with the supplemental information retrieved from the identified application;
        receiving input from a user defining a note, wherein the note includes at least a portion of the clipboard item and at least a portion of the supplemental information;
        presenting the note in an output text box of the clipboard;
        receiving a user input command to send the note presented in the output text box of the clipboard;
        in response to receiving the user input command to send the note:
            identifying an application corresponding to the note; and
            outputting the information included in the note to the identified application corresponding to the note,
        wherein outputting the information included in the note to the identified application corresponding to the note comprises outputting a call summary to a customer relationship management application that associates the call summary with a corresponding customer record.

12. The system of claim 11, wherein the processor electronics are further configured to perform operations comprising:
    detecting a second information capture operation; and
    creating a second clipboard item comprising information collected by the second information capture operation, wherein the second clipboard item is separately displayed in the clipboard.

13. The method of claim 1 further comprising:
    during the information capture operation, extracting data that identifies the source of the information collected in the information capture operation, the source being an application or window that was the source of the collected information,
    wherein creating the clipboard item further comprises including, based on the extracted data, a source identifier in the clipboard item, the source identifier identifying the application or window that was the source of the collected information.

14. The method of claim 1 wherein receiving input from the user defining the note comprises dragging and dropping the clipboard item into the output text box of the clipboard.

15. The method of claim 1 wherein identifying the application corresponding to the note comprises:
    determining that multiple applications are associated with the note;
    presenting a menu of the multiple applications associated with the note to which the note may be output; and
    receiving a user selection of an application, from among the multiple applications, to which to output the note.

16. The method of claim 1 further comprising:
    receiving a user input command to clear the note presented in the output text box of the clipboard; and in response to receiving the user input command to clear the note:
deleting all of the information displayed in the output text box; and
maintaining display of all clipboard items associated with the clipboard.

17. The method of claim 1 wherein automatically supplementing the clipboard with the supplemental information retrieved from the identified application comprises automatically adding the supplemental information to the clipboard item.

18. The method of claim 1 wherein automatically supplementing the clipboard with the supplemental information retrieved from the identified application comprises automatically generating, in the clipboard, an additional clipboard item that includes the supplemental information, the additional clipboard item being different from the clipboard item.

19. The method of claim 1 wherein automatically supplementing the clipboard with the supplemental information retrieved from the identified application comprises automatically generating a pop-up window that includes the supplemental information.

20. The method of claim 1 wherein automatically triggering an operation to retrieve, from the identified application, the supplemental information related to the item of specified textual content comprises automatically generating a query based on the detected item of specified textual content and automatically submitting the generated query to a database to retrieve the supplemental information related to the detected item of specified textual content.

21. A method comprising:
detecting an information capture operation performed in an application;
creating a clipboard item comprising information collected by the information capture operation, wherein the clipboard item is associated with a clipboard;
applying, using at least one processor, a text filter to analyze the information collected by the information capture operation for one or more items of specified textual content;
based on the analysis applied by the text filter, detecting, using at least one processor, an item of specified textual content in the information collected by the information capture operation;
in response to detecting the item of specified textual content in the information collected by the information capture operation:
automatically identifying, using at least one processor, an application that includes supplemental information related to the item of specified textual content, the application being different than a source of the information collected by the information capture operation,
automatically triggering, using at least one processor, an operation to retrieve, from the identified application, the supplemental information related to the item of specified textual content, and
automatically supplementing, using at least one processor, the clipboard with the supplemental information retrieved from the identified application;
receiving input from a user defining a note, wherein the note includes at least a portion of the clipboard item and at least a portion of the supplemental information; and
presenting the note in an output text box of the clipboard,
wherein detecting the item of specified textual content in the information collected by the information capture operation comprises detecting a product identifier in the information collected by the information capture operation;
wherein automatically identifying the application that includes supplemental information related to the item of specified textual content comprises automatically identifying a product catalog application associated with the detected product identifier;
wherein automatically triggering the operation to retrieve, from the identified application, the supplemental information related to the item of specified textual content comprises automatically obtaining, from the product catalog application, a product description corresponding to the detected product identifier; and
wherein automatically supplementing the clipboard with the supplemental information retrieved from the identified application comprises automatically supplementing the clipboard with the product description obtained from the product catalog application.

22. A method comprising:
detecting an information capture operation performed in an application;
creating a clipboard item comprising information collected by the information capture operation, wherein the clipboard item is associated with a clipboard;
applying, using at least one processor, a text filter to analyze the information collected by the information capture operation for one or more items of specified textual content;
based on the analysis applied by the text filter, detecting, using at least one processor, an item of specified textual content in the information collected by the information capture operation;
in response to detecting the item of specified textual content in the information collected by the information capture operation:
automatically identifying, using at least one processor, an application that includes supplemental information related to the item of specified textual content, the application being different than a source of the information collected by the information capture operation,
automatically triggering, using at least one processor, an operation to retrieve, from the identified application, the supplemental information related to the item of specified textual content, and
automatically supplementing, using at least one processor, the clipboard with the supplemental information retrieved from the identified application;
receiving input from a user defining a note, wherein the note includes at least a portion of the clipboard item and at least a portion of the supplemental information; and
presenting the note in an output text box of the clipboard,
wherein detecting the item of specified textual content in the information collected by the information capture operation comprises detecting a product identifier in the information collected by the information capture operation;
wherein automatically identifying the application that includes supplemental information related to the item of specified textual content comprises automatically identifying an inventory management application associated with the detected product identifier;
wherein automatically triggering the operation to retrieve, from the identified application, the supplemental information related to the item of specified textual content comprises automatically accessing, from the inventory management application, product availability information corresponding to the detected product identifier; and wherein automatically supplementing the clipboard with the supplemental information retrieved from the identified application comprises automatically supplementing the clipboard with the product availability information accessed from the inventory management application.

23. The method of claim 1 further comprising:

determining an identity of the source from which the information was collected by the information capture operation;

determining whether the identity of the source corresponds to a text filter included in multiple text filters associated with the clipboard; and based on a determination that the identity of the source corresponds to a text filter included in multiple text filters associated with the clipboard, identifying, from among the multiple text filters, the text filter corresponding to the identity of the source, wherein applying the filter to analyze the information collected by the information capture operation for one or more items of specified textual content comprises applying the identified text filter corresponding to the identity of the source.

24. A computer program product, encoded on a computer-readable medium, operable to cause data processing apparatus to perform operations comprising:

detecting an information capture operation performed in an application;

creating a clipboard item comprising information collected by the information capture operation, wherein the clipboard item is associated with a clipboard;

applying, using at least one processor, a text filter to analyze the information collected by the information capture operation for one or more items of specified textual content;

based on the analysis applied by the text filter, detecting, using at least one processor, an item of specified textual content in the information collected by the information capture operation;

in response to detecting the item of specified textual content in the information collected by the information capture operation:

automatically identifying, using at least one processor, an application that includes supplemental information related to the item of specified textual content, the application being different than a source of the information collected by the information capture operation, automatically triggering, using at least one processor, an operation to retrieve, from the identified application, the supplemental information related to the item of specified textual content, and automatically supplementing, using at least one processor, the clipboard with the supplemental information retrieved from the identified application;

receiving input from a user defining a note, wherein the note includes at least a portion of the clipboard item and at least a portion of the supplemental information; and presenting the note in an output text box of the clipboard, wherein detecting the item of specified textual content in the information collected by the information capture operation comprises detecting a product identifier in the information collected by the information capture operation;

wherein automatically identifying the application that includes supplemental information related to the item of specified textual content comprises automatically identifying a product catalog application associated with the detected product identifier;

wherein automatically triggering the operation to retrieve, from the identified application, the supplemental information related to the item of specified textual content comprises automatically obtaining, from the product catalog application, a product description corresponding to the detected product identifier; and wherein automatically supplementing the clipboard with the supplemental information retrieved from the identified application comprises automatically supplementing the clipboard with the product description obtained from the product catalog application.

25. A computer program product, encoded on a computer-readable medium, operable to cause data processing apparatus to perform operations comprising:

detecting an information capture operation performed in an application;

creating a clipboard item comprising information collected by the information capture operation, wherein the clipboard item is associated with a clipboard;

applying, using at least one processor, a text filter to analyze the information collected by the information capture operation for one or more items of specified textual content;

based on the analysis applied by the text filter, detecting, using at least one processor, an item of specified textual content in the information collected by the information capture operation;

in response to detecting the item of specified textual content in the information collected by the information capture operation:

automatically identifying, using at least one processor, an application that includes supplemental information related to the item of specified textual content, the application being different than a source of the information collected by the information capture operation, automatically triggering, using at least one processor, an operation to retrieve, from the identified application, the supplemental information related to the item of specified textual content, and automatically supplementing, using at least one processor, the clipboard with the supplemental information retrieved from the identified application;

receiving input from a user defining a note, wherein the note includes at least a portion of the clipboard item and at least a portion of the supplemental information; and presenting the note in an output text box of the clipboard, wherein detecting the item of specified textual content in the information collected by the information capture operation comprises detecting a product identifier in the information collected by the information capture operation;

wherein automatically identifying the application that includes supplemental information related to the item of specified textual content comprises automatically identifying an inventory management application associated with the detected product identifier;

wherein automatically triggering the operation to retrieve, from the identified application, the supplemental information related to the item of specified textual content comprises automatically accessing, from the inventory management application, product availability information corresponding to the detected product identifier; and wherein automatically supplementing the clipboard with the supplemental information retrieved from the identified application comprises automatically supplementing the clipboard with the product availability information accessed from the inventory management application.

26. A system comprising:

a user interface for presenting a clipboard to a user and for receiving one or more inputs from the user; and processor electronics configured to perform operations comprising:

detecting an information capture operation performed in an application;

creating a clipboard item comprising information collected by the information capture operation, wherein the clipboard item is associated with a clipboard;

applying, using at least one processor, a text filter to analyze the information collected by the information capture operation for one or more items of specified textual content;

based on the analysis applied by the text filter, detecting, using at least one processor, an item of specified textual content in the information collected by the information capture operation;

in response to detecting the item of specified textual content in the information collected by the information capture operation:

automatically identifying, using at least one processor, an application that includes supplemental information related to the item of specified textual content, the application being different than a source of the information collected by the information capture operation, automatically triggering, using at least one processor, an operation to retrieve, from the identified application, the supplemental information related to the item of specified textual content, and automatically supplementing, using at least one processor, the clipboard with the supplemental information retrieved from the identified application;

receiving input from a user defining a note, wherein the note includes at least a portion of the clipboard item and at least a portion of the supplemental information; and presenting the note in an output text box of the clipboard, wherein detecting the item of specified textual content in the information collected by the information capture operation comprises detecting a product identifier in the information collected by the information capture operation;

wherein automatically identifying the application that includes supplemental information related to the item of specified textual content comprises automatically identifying a product catalog application associated with the detected product identifier;

wherein automatically triggering the operation to retrieve, from the identified application, the supplemental information related to the item of specified textual content comprises automatically obtaining, from the product catalog application, a product description corresponding to the detected product identifier; and wherein automatically supplementing the clipboard with the supplemental information retrieved from the identified application comprises automatically supplementing the clipboard with the product description obtained from the product catalog application.

27. A system comprising:

a user interface for presenting a clipboard to a user and for receiving one or more inputs from the user; and processor electronics configured to perform operations comprising:

detecting an information capture operation performed in an application;

creating a clipboard item comprising information collected by the information capture operation, wherein the clipboard item is associated with a clipboard;

applying, using at least one processor, a text filter to analyze the information collected by the information capture operation for one or more items of specified textual content;

based on the analysis applied by the text filter, detecting, using at least one processor, an item of specified textual content in the information collected by the information capture operation;

in response to detecting the item of specified textual content in the information collected by the information capture operation:

automatically identifying, using at least one processor, an application that includes supplemental information related to the item of specified textual content, the application being different than a source of the information collected by the information capture operation, automatically triggering, using at least one processor, an operation to retrieve, from the identified application, the supplemental information related to the item of specified textual content, and automatically supplementing, using at least one processor, the clipboard with the supplemental information retrieved from the identified application;

receiving input from a user defining a note, wherein the note includes at least a portion of the clipboard item and at least a portion of the supplemental information; and presenting the note in an output text box of the clipboard, wherein detecting the item of specified textual content in the information collected by the information capture operation comprises detecting a product identifier in the information collected by the information capture operation;

wherein automatically identifying the application that includes supplemental information related to the item of specified textual content comprises automatically identifying an inventory management application associated with the detected product identifier;

wherein automatically triggering the operation to retrieve, from the identified application, the supplemental information related to the item of specified textual content comprises automatically accessing, from the inventory management application, product availability information corresponding to the detected product identifier; and wherein automatically supplementing the clipboard with the supplemental information retrieved from the identified application comprises automatically supplementing the clipboard with the product availability information accessed from the inventory management application.

* * * * *

UNITED STATES PATENT AND TRADEMARK OFFICE
CERTIFICATE OF CORRECTION

| | | |
|---|---|---|
| PATENT NO. | : 7,624,353 B2 | Page 1 of 1 |
| APPLICATION NO. | : 11/537581 | |
| DATED | : November 24, 2009 | |
| INVENTOR(S) | : Beumer | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 406 days.

Signed and Sealed this

Ninth Day of November, 2010

David J. Kappos
*Director of the United States Patent and Trademark Office*